Figure 3:
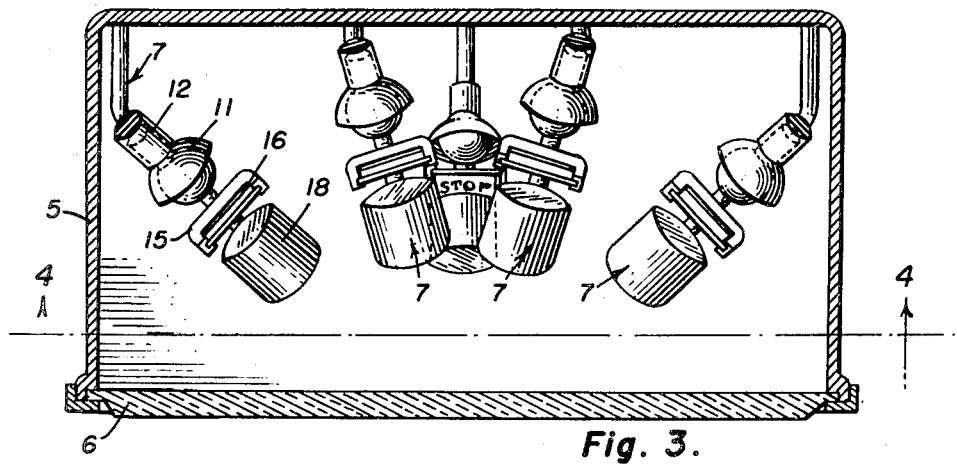

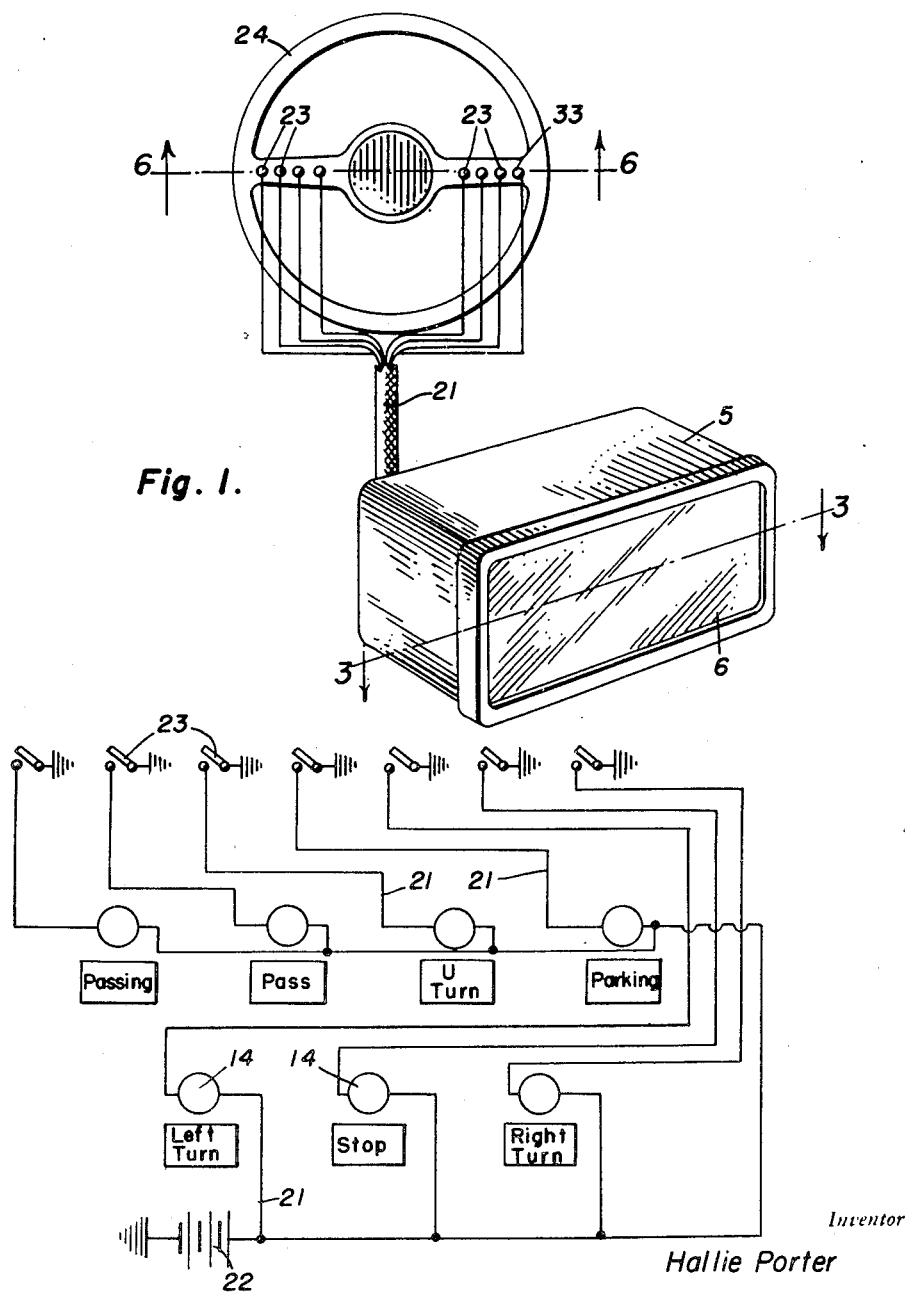

March 14, 1950     H. PORTER     2,500,201
SIGNAL LIGHT PROJECTION DEVICE

Filed April 30, 1947     3 Sheets-Sheet 2

Inventor
Hallie Porter

By Clarence A. O'Brien
and Harvey B. Jacobson
Attorneys

March 14, 1950 H. PORTER 2,500,201
SIGNAL LIGHT PROJECTION DEVICE
Filed April 30, 1947 3 Sheets-Sheet 3

Inventor
Hallie Porter

By *Clarence A. O'Brien*
and *Harvey B. Jacobson*
Attorneys

Patented Mar. 14, 1950

2,500,201

UNITED STATES PATENT OFFICE 2,500,201

SIGNAL LIGHT PROJECTION DEVICE

Hallie Porter, Chicago, Ill., assignor to Marshall Crummie, Chicago, Ill.

Application April 30, 1947, Serial No. 744,820

1 Claim. (Cl. 177—329)

The present invention relates to new and useful improvements in signals and more particularly to signaling lamps for automobiles and other motor-driven vehicles.

An important object of the present invention is to provide a signal of this character in which any one of a plurality of illuminated signs carrying different types of signaling information may be selectively exhibited against a single, translucent screen or panel carried by either the front, rear, or at both ends of the vehicle.

A further object of the invention is to provide a vehicle signaling device in which a plurality of signaling units are enclosed in a single housing having one side provided with a screen or translucent panel and in which each of the units includes a film having the signaling indicia carried thereby and positioned between a lamp and a lens for projecting the signal onto the screen, whereby the same may be observed from either the front, rear, or from either end of the vehicle.

A still further object is to provide an apparatus of this character of simple and practical construction, which is efficient and reliable in operation, relatively inexpensive to manufacture and otherwise well adapted for the purposes for which the same is intended.

Figure 4:
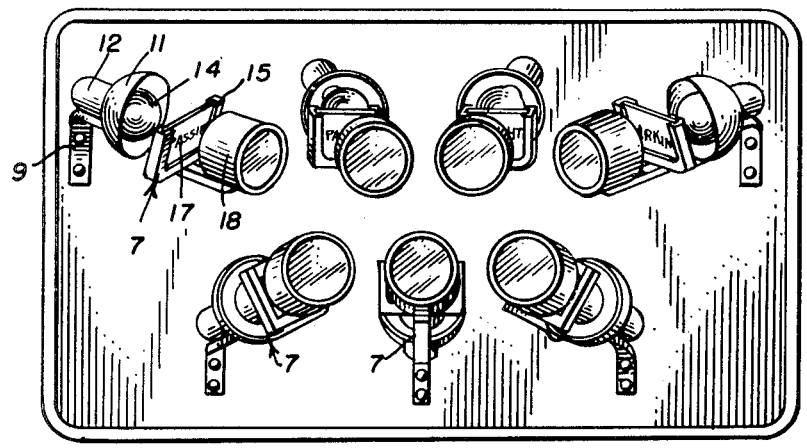
Figure 5:
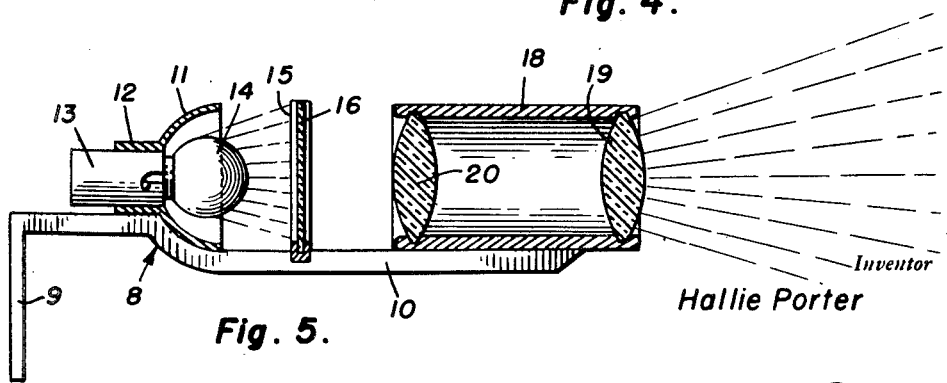
Figure 6:
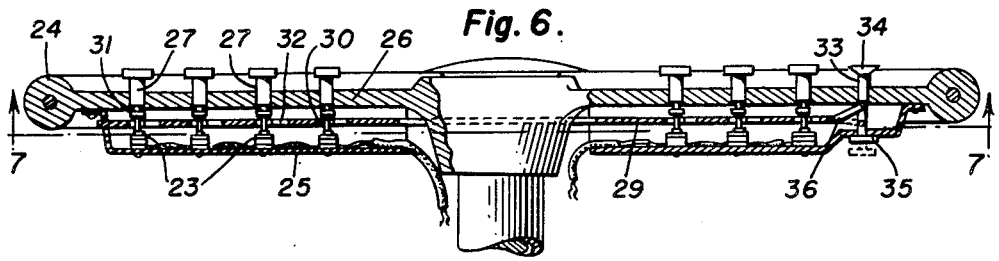
Figure 7:
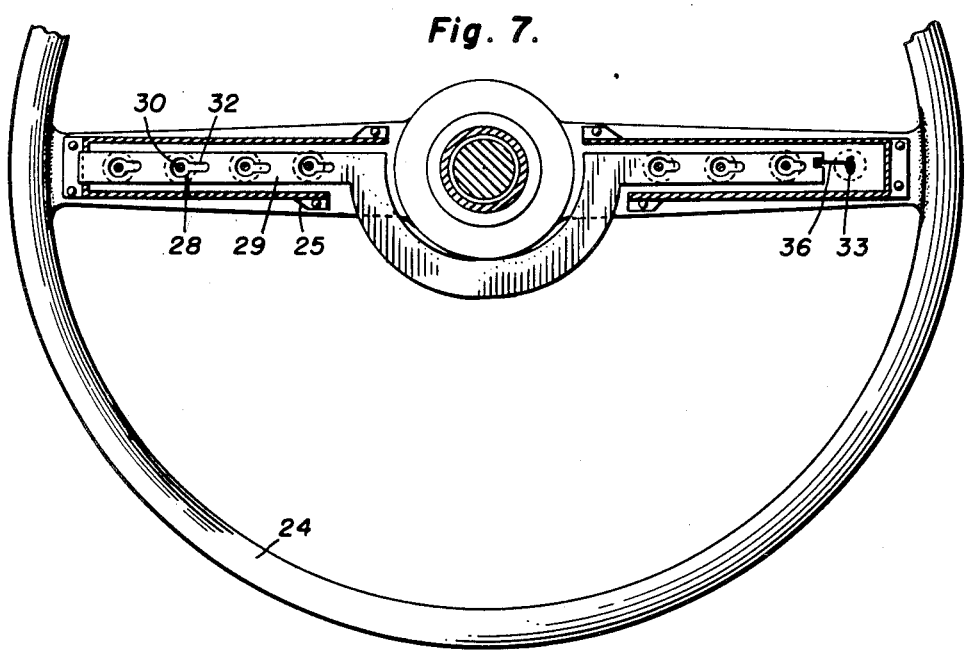
Figure 8:
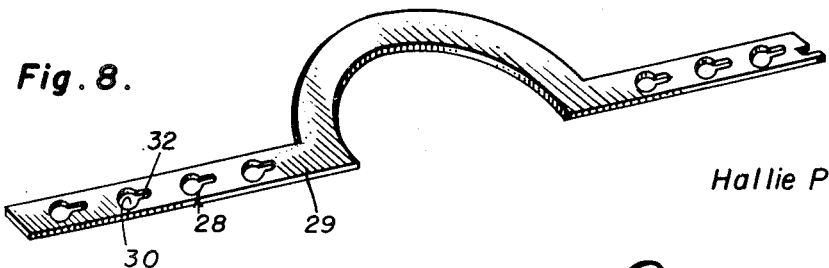

Other objects and advantages reside in the details of construction and operation as more fully hereinafter described and claimed, reference being had to the accompanying drawings forming part hereof, wherein like reference numerals refer to like parts throughout, and in which:

Figure 1 is a perspective view of the signal housing showing the control switches for the signaling element carried by the steering wheel of a vehicle, Figure 2 is a diagram of the electric circuit for the various signaling elements, Figure 3 is a sectional view taken substantially on a line 3—3 of Figure 1, Figure 4 is a sectional view taken on a line 4—4 of Figure 3, Figure 5 is an enlarged longitudinal sectional view of one of the signaling elements, Figure 6 is an enlarged sectional view taken on a line 6—6 of Figure 1, Figure 7 is a sectional view taken on a line 7—7 of Figure 6, and Figure 8 is a perspective view of the locking bar for the signal push buttons.

Referring now to the drawings in detail, wherein, for the purpose of illustration, I have disclosed a preferred embodiment of the invention, the numeral 5 designates a signal housing which may be mounted in a suitable position at either the front, rear, or at both ends of a vehicle and which comprises a substantially rectangular, box-like structure having a translucent cover or screen 6 mounted in one side thereof.

Positioned in the housing is a plurality of signaling elements or units designated generally at 7, each of said units being of duplicate construction, and accordingly detailed explanation of one will suffice for all.

Each signaling unit includes a bracket 8, including a leg 9 adapted for attaching to the rear wall of the housing, and an arm 10 extending in a direction toward the center of the cover 6.

A lamp reflector 11 of concavo-convex construction and including a tubular extension 12 at its central portions is suitably secured on the rear portion of the arm 10 and in which is mounted a lamp socket 13 of conventional construction for mounting a lamp 14 therein.

A U-shaped frame 15 is mounted in transversely disposed position on the arm 10 forwardly of the lamp 14 and in which is positioned a film 16 of a conventional type and which carries signaling indicia or signs 17.

Forwardly of the film 16 and mounted at the front end of the arm 10 is a tubular lens holder 18 having front and rear lenses 19 and 20 mounted therein for directing light from the lamp 14 onto the rear of the cover 6 substantially at the central portion thereof. The lens 19 may be of a desired color.

The lamps 14 for each of the signaling units 7 are electrically connected in a circuit 21 with the battery 22 of the vehicle, the circuit for each lamp being controlled by conventional spring push-button switches 23 mounted on the steering wheel 24 of the vehicle.

The switches 23 are of conventional construction mounted in a housing 25 attached to the underside of the spokes 26 of the steering wheel and include a spring projected push-button 27 projecting upwardly through one of the spokes. Each push-button also works through a keyhole slot 28 in a locking bar 29 slidably mounted in the housing 25, the push-button being freely movable in the larger end 30 of the slot and is formed with an annular groove 31 for entering the narrow end 32 of the slot to lock the push-button in depressed position with the switch closed.

Any one of the push-buttons is secured in a locked position by a locking and releasing push-button 33 slidably mounted in one of the spokes 26 and through the bottom of the housing 25 and formed with upper and lower heads 34 and 35, respectively. A link 36 is pivoted at one end to the end of locking bar 29 nearest the narrow ends of the slots and is pivoted to an intermediate part of push-button 33.

The switches 23 are secured in a closed position for energizing their associated signal lamps 14 by depressing a proper push-button 27 and if it is desired to retain the signal in its "on" position, the locking and releasing push-button 33 is also depressed to slide the bar 29 toward the left to engage the groove 31 in the narrow end 32 of slot 28. The link 36 is moved downwardly past the center of its pivot to thus lock the bar and switch push-button. To release the switch push-button 27, the push-button 33 is pushed upwardly by head 35 and the link 36 drags the bar 29 toward the right to release the push-button 27.

From the foregoing, it will be apparent that upon energizing one of the lamps 14 of the signaling units 7, the light will be projected through the film 16 and lenses 19 and 20 for projecting the sign 17 on an enlarged scale onto the screen or cover 6.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and within the scope of the appended claim.

What I claim is:

A vehicle signal comprising a signal housing having a translucent screen in one wall, and a projection device mounted in the housing, and including a lamp, a film supported forwardly of the lamp and provided with signaling indicia, a lens positioned in front of the film and arranged to project the indicia onto the center of the screen, and a supporting bracket secured in the housing and including an arm on which the lamp, film and lens are supported in spaced alignment for mounting as a unit in the housing.

HALLIE PORTER.

REFERENCES CITED

The following references are of record in the file of this patent:

UNITED STATES PATENTS

| Number | Name | Date |
|---|---|---|
| 1,032,160 | Schenck et al. | July 9, 1912 |
| 1,202,812 | Dengel | Oct. 31, 1916 |
| 1,290,947 | Erskine | Jan. 14, 1919 |
| 1,350,539 | Baltes | Aug. 24, 1920 |
| 1,519,535 | Finis | Dec. 16, 1924 |
| 1,859,515 | Kageyama | May 24, 1932 |